United States Patent Office 3,632,740
Patented Jan. 4, 1972

3,632,740
TOPICAL DEVICE FOR THE THERAPEUTIC MANAGEMENT OF DERMATOLOGICAL LESIONS WITH STEROIDS
Raymond C. V. Robinson, Baltimore, Md., and Gavin Hildick-Smith, Princeton, and Thomas Swindlehurst, Jr., Metuchen, N.J., assignors to Johnson & Johnson
No Drawing. Continuation-in-part of application Ser. No. 345,584, Feb. 18, 1964. This application June 13, 1968, Ser. No. 736,564
Int. Cl. A61l 15/00, 15/03, 15/06
U.S. Cl. 424—28
20 Claims

ABSTRACT OF THE DISCLOSURE

The period of effectiveness of corticosteroids for topical treatment of inflammatory cutaneous lesions, as shown by their anti-inflammatory effect, is substantially enhanced by having the corticosteroid dispersed through a pressure-sensitive adhesive which is adhered to the area to be treated in the form of a thin film. Pressure-sensitive adhesives vary in their effectiveness, acrylic pressure-sensitive adhesives being the most effective in increasing the period of effectiveness of the corticosteroid. In practice a therapeutic device is empolyed comprising a flexible backing containing a coating of pressure-sensitive adhesive containing an effective amount of corticosteroid dispersed therethrough. This device is applied to the area to be treated with the coating of pressure-sensitive adhesive contacting the area.

---

This is a continuation-in-part of application Ser. No. 345,584, filed Feb. 18, 1964 now abandoned.

The present invention relates to the topical application of corticosteroids and to new and improved therapeutic adhesive compositions for the therapeutic management of dermatological lesions, such for example as the topical treatment of inflammatory cutaneous lesions.

The corticosteroids as a class have been found to have excellent therapeutic acitvity when applied topically to the skin for the management of dermatological lesions. Such treatment is described, for example, in the section titled "Topical Steroids" beginning on page 151 of Dermatologic Medications, Second edition, 1960 by Lerner and Lerner. Although the corticosteroids individually vary appreciably in their activity in that substantially smaller concentrations of some are quite effective whereas larger concentrations of others are needed, they all appear to have in common the characteristic of showing substantial therapeutic activity when applied topically in the treatment of dermatological lesions which is believed to be due in part to their anti-inflammatory effect.

The corticosteroids are white crystalline materials that can be applied as substantially pure substances in a powder form. However, such application is not only wasteful of a relatively expensive material, but the concentration is substantially greater than what is needed. Accordingly, in topical application they are generally applied in a cream vehicle or ointment base in which they are generally present in concentrations of about .1% to 1.0% by weight depending on the activity of the particular corticosteroid being used.

Although the corticosteroids have been found to be quite effective, the period of their effectiveness as shown by their anti-inflammatory effect when applied topically in a cream base without further treatment, is relatively limited. The corticosteroids when being applied in this manner without further treatment generally are effective for no more than about two to three hours. Optimum results are achieved by applying sufficient medication to provide a deposit of medication on the skin surface from which absorption can occur for prolonged periods of time.

The effectiveness of the treatment can be substantially improved if the period of activity of the corticosteroids applied can be substantially lengthened. It was recently discovered that this could be done by first applying the corticosteroid in the cream base to the area to be treated and then wrapping the area with a substantially impervious thin plastic film. By so treating the affected skin area the effectiveness of the corticosteroid was substantially enhanced and its period of effectiveness, as shown by its anti-inflammatory effect, substantially lengthened. However, the film wrapping of the applied corticosteroid containing cream or ointment has the disadvantage that it is difficult, where the patient is active, to keep the film wrap or covering in place over the applied ointment.

It is an object of the present invention to substantially increase the period of effectiveness of topically applied corticosteroids. A still further object of the present invention is to prepare a corticosteroid containing compositions which, when applied to the skin, give an anti-inflammatory effect of substantially greater duration than obtained by corticosteroids of the same concentration when applied in a cream base without further treatment. It is a still further object of the present invention to prepare adhesive coated porous protective sheets containing corticosteroids in the adhesive having a relatively long period of activity when topically applied. Other objects and advantages of the present invention will become apparent from the following description taken in connection with the specific examples contained therein which are set forth by way of illustration and example of certain embodiments of this invention.

It has now been discovered that the period of effective activity of topically applied corticosteroids can be substantially increased by incorporating the corticosteroid in a pressure-sensitive adhesive base, thoroughly blending the corticosteroid with the adhesive, spreading the pressure-sensitive adhesive so formed onto a flexible backing and then applying the pressure-sensitive adhesive coated sheet or tape, so formed, to the skin, the pressure-sensitive adhesive coating containing the corticosteroid intimately contacting and adhering to the underlying skin surface. When the corticosteroid is so topically applied, the period of effectiveness of the corticosteroid is substantially increased, the same being effective for well over twenty-four hours for some pressure-sensitive adhesive compositions as compared to the approximately three hours of effectiveness where applied in a cream base without further treatment.

The corticosteroid should be incorporated into the pressure-sensitive adhesive in such a manner that it is thoroughly and completely dispersed throughout the entire pressure-sensitive adhesive. It is found that this can best be done by first dissolving the corticosteroid in a liquid vehicle such for example as isopropanol or ethyl acetate and then thoroughly blending the same with the pressure-sensitive adhesive composition. As corticosteroids tend to decompose at temperatures much in excess of about 180° F. care should be taken that, during the incorporation of the corticosteroid in the pressure-sensitive adhesive composition, temperatures do not exceed much above 180° F. otherwise the effectiveness of the corticosteroid is substantially impaired. Accordingly, the corticosteroid cannot be added to the pressure-sensitive adhesive in the conventional blending operations of rubber base pressure-sensitive adhesives wherein the composition in the blender generally reaches a temperature well in excess of 200° F., the temperatures generally going as high as 350° F.

When incorporating the corticosteroid into a rubber base adhesive, it is generally preferred to first formulate the adhesive mass and then to slurry or dissolve the same in a solvent medium to which is then added a solution of the corticosteroid to assure complete dispersion of the corticosteroid throughout the adhesive. The adhesive is then solvent spread on a backing, the solvent thereafter being evaporated. If desired, a moisture vapor pervious tape may be prepared. This may be done by perforating the tape after spreading the adhesive, by using a pervious backing and a pervious adhesive such for example as obtained by an open pattern spread or by any other method.

As the purpose of the backing is primarily to form a support for the pressure-sensitive adhesive film substantially any flexible backing material may be used. These include fabrics, both woven and nonwoven, paper, thin metal foil, and organic films, the most commonly used films being those formed of plasticized polyvinyl chloride, cellophane, Mylar, polyethylene and polypropylene.

The pressure-sensitive adhesives most generally used for skin application are the rubber based pressure-sensitive adhesives, the polyvinyl alkyl ether pressure-sensitive adhesives and the acrylate pressure-sensitive adhesives. These adhesives are well known to those skilled in the pressure-sensitive adhesive art and differ from each other primarily in the type of base polymer used in preparing the same. The terminology rubber base, polyvinyl alkyl ether base and acrylate pressure-sensitive adhesive is used to indicate that the major portion of base polymer, i.e., over 50% by weight, in the pressure-sensitive adhesive is rubber, polyvinyl and ether or alkyl acrylate polymer. Rubber base, polyvinyl ether base and acrylate base pressure-sensitive adhesives are discussed, for example, in the section "Adhesive Tapes" by C. W. Bemmels, beginning on page 585 in the Handbook of Adhesives, edited by Irving Skeist, Reinhold Publishing Co., 1962. Also, numerous acrylate pressure-sensitive adhesives are described, for example, in U.S. Pats. 3,008,850 and Re. 24,906, and British Pat. No. 951,428.

Although the period of effectiveness of a corticosteroid during topical application is substantially increased by having it in a pressure-sensitive adhesive base as heretofore indicated, in some pressure-sensitive adhesive bases the period of effectiveness is greater than in some others making it necessary to either use, with that particular pressure-sensitive adhesive, a corticosteroid of greater activity or if a less active corticosteroid is to be used to incorporate same in a somewhat larger quantity. In practicing the present invention the most effective pressure-sensitive adhesives are found to be the acrylate pressure-sensitive adhesives, the term acrylate pressure-sensitive adhesives being the term used in referring to those pressure-sensitive adhesives formed from polymers of alcohol esters of acrylic acid or copolymers of these esters either with each other or with additive copolymerizable monomers having strongly polar groups.

In the compounding of pressure-sensitive adhesives, particularly rubber base pressure-sensitive adhesives, it is frequently desirable to include a filler. Particularly for rubber base surgical pressure-sensitive adhesives zinc oxide is included either alone or together with other fillers such as aluminum hydrate and titanium oxide as its inclusion acts to internally reinforce the adhesive and improve its skin adherence. The filler is generally included in amounts of about 10 to 40 percent by weight of the adhesive composition. The presence of the filler itself appears to have some slight anti-inflammatory effects as shown in the example hereinafter set forth. However, this slight anti-inflammatory effect of the filler is substantially different from that of the corticosteroid and should not be confused therewith, the filler in some instances tending to reduce the effectiveness of the corticosteroid.

Not only are the corticosteriods containing pressure-sensitive adhesive masses of the present invention and the pressure-sensitive adhesive coated sheets and tapes formed therefrom highly useful in the therapeutic management of dermatological lesions where the same are present on the skin prior to covering with the corticosteroid containing pressure-sensitive adhesive, but the corticosteriod pressure-sensitive adhesive coated sheet materials of the present invention have the further advantage that irritation caused from the adhesive itself, either through sensitivity to some of the ingredients in the same or through mechanical irritation caused by the tape is beneficially treated by the cortiscosteroid in the adhesive, thus in many instances preventing dermatitis that may otherwise result from prolonged tape wear. It is common practice for example to tape angles and various parts of the human body either for supporting the same or for holding dressings in place where the tape is maintained in contact with the skin for substantial periods of time. With many people the tape is found to be substantially irritating with the result that substantial skin lesions occurs, such for example as the development of dermatitis venerata. As the corticosteroid, which is beneficial in the treatment and prevention of such skin lesions, maintains its activity for a substantial period of time when applied topically in the adhesive, dermatitis is controlled or prevented from occurring with the result that substantial discomfort and irritation to the patient is avoided.

Another surprising, though highly beneficial result, obtained through the treatment of skin lesions by applying over the skin a pressure-sensitive adhesive coated sheet containing a corticosteriod in the adhesive, is the residual anti-inflammatory effect of the corticosteroid for extended periods even after the adhesive coated sheet is removed. Where the corticosteroid is contained in a cream base and the ointment so formed is applied on a skin area which has been highly irritated as by repeated stripping therefrom of adhesive tape and the ointment covered area is left exposed to air it returns to its initial redness after about 3 hours. However, where covered by adhesive tapes containing the same corticosteroid in the same concentration and the tape is then removed after several hours of wearing, not only is there no sign of redness during the several hours that the tape remains on the skin but redness, particularly for those tapes containing acrylate masses, does not return until several hours after the tape has been removed. This residual effect is indeed surprising in view of the relatively short period over which the corticosteroid containing ointment is effective.

The invention is further illustrated by the following examples which are given for the purpose of illustration only and the invention is not to be limited thereto.

EXAMPLE I

Pressure-sensitive adhesive coated sheets having the pressure-sensitive compositions indicated are prepared in the following manners:

The rubber base pressure-sensitive adhesive masses both of synthetic and natural rubber are prepared by blending on a Banbury mixer the elastomer, tackifying resin, plasticizer and filler in the amounts indicated.

The thoroughly blended components are then dispersed in toluene solvent to which is added a 10% solution of corticosteroid in isopropanol in amounts to give a solids concentration of hydrocortisonealcohol in the amounts indicated. The resulting viscous fluid mix is then spread on a vinylchloride polymer backing to a weight of about 2 ounces per square yard and the solvent is then removed by drying.

The acrylate pressure-sensitive adhesive coated sheets are prepared by spreading a solution of a copolymer prepared by polymerization of substantially equal molar amounts of 2-ethylhexylacrylate and viny acetate in an ethyl acetate solvent spreading onto a vinyl chloride polymer backing and then evaporating the solvent to leave the acrylate pressure-sensitive adhesive meass on the backing. Polyvinyl chloride film mackings for pressure-sensitive adhesive tapes are well known in the art. The backing used being, for example, of the type discussed in U.S. Pat. No. 2,877,141. The pressure-sensitive adhesive coated sheet is then cut into tape strips of 1″ width. Tapes are prepared in one instance by adding to the acrylate solvent solution and thoroughly blending therewith prior to spreading on the backing a 10% solution of hydrocortisonealcohol in isopropanol the solution of hydrocortisonealcohol being added in amounts sufficient to give a hydrocortisonealcohol content, based on the solids, in the pressure-sensitive adhesive in the amounts indicated. The tapes containing, as the corticosteroid, 0.1% triamcinolone acetonide were prepared in similar manner. The vinyl ether adhesive coated sheets, in each instance, are prepared by dissolving the pressure-sensitive vinyl ether in ethyl acetate solvent, adding thereto a solution of the hydrocortisonealcohol in ethyl acetate, sufficient hydrocortisonealcohol being added to give, on a solids basis, the concentration hydrocortisonealcohol indicated.

Following the procedure described, tapes are made containing the following types of pressure-sensitive adhesive masses:

Acrylate base

Tape A: Percent
 A tacky acrylate copolymer of 2-ethylhexyl-acrylate and vinyl acetate _____ 100

Tape B:
 Acrylate copolymer of Tape "A"_____ 99.9
 Hydrocortisonealcohol _____ 0.1
 —————
 100.0

Tape C:
 Acrylate copolymer of Tape "A"_____ 70.0
 Filler _____ 30.0
 —————
 100.0

Tape D:
 Acrylate copolymer of Tape "A"_____ 69.9
 Filler _____ 30.0
 Hydrocortisonealcohol _____ 0.1
 —————
 100.0

Tape E:
 Acrylate copolymer of Tape "A"_____ 99.9
 Triamcinolone acetonide _____ 0.1
 —————
 100.0

Synthetic rubber base

Tape F:
 Polyisobutylene elastomer _____ 20.3
 Vegetable oil factice_____ 18.7
 Tackifier (polyterpene resin)_____ 23.4
 Plasticizer _____ 37.6
 —————
 100.0

Tape G:
 Adhesive mass composition of Tape F_____ 99.9
 Hydrocortisonealcohol _____ 0.1
 —————
 100.0

Tape H:
 Polyisobutylene elastomer _____ 13.0
 Vegetable oil factice_____ 12.0
 Tackifier (polyterpene resin)_____ 15.0
 Plasticizer _____ 24.0
 Filler _____ 36.0
 —————
 100.0

Tape I:
 Adhesive mass composition of Tape "H"____ 99.9
 Hydrocortisonealcohol _____ 0.1
 —————
 100.0

Natural rubber base

Tape J: Percent
 Pale crepe rubber_____ 43.7
 Tackifying resin _____ 41.0
 Plasticizer _____ 13.2
 Antioxident _____ 2.1
 —————
 100.0

Tape K:
 Adhesive mass composition of Tape "J"_____ 99.9
 Hydrocortisonealcohol _____ 0.1
 —————
 100.0

Tape L:
 Pale crepe rubber_____ 31.7
 Tackifying resin _____ 27.9
 Plasticizer _____ 9.6
 Antioxident _____ 1.5
 Filler _____ 29.3
 —————
 100.0

Tape M:
 Adhesive mass composition of Tape "L"_____ 99.9
 Hydrocortisonealcohol _____ 0.1
 —————
 100.0

Polyether base

Tape N:
 Tacky polyvinyl ethyl ether _____ 94.0
 Finely divided silica (sold under the trade name Cab-O-Sil) _____ 6.0
 —————
 100.0

Tape O:
 Adhesive mass composition of Tape "N"_____ 99.9
 Hydrocortisonealcohol _____ 1.1
 —————
 100.0

Tape P:
 Tacky polyvinyl ether polymer_____ 65.8
 Finely divided silica (sold under the trade name Cab-O-Sil) _____ 4.2
 Filler _____ 30.0
 —————
 100.0

Tape Q:
 Adhesive mass composition of Tape "P"_____ 99.9
 Hydrocortisonealcohol _____ 0.1
 —————
 100.0

The filler in each adhesive composition is the same, the filler being a conventional adhesive filler containing a substantial amount of zinc oxide which may if desired comprise the entire filler.

Inflammatory lesions are induced on the leg following a method similar to that described by W. W. Hazeltine (Nature, Nov. 3, 1962). In the process used a portion of the epidermis is stripped from the skin by applying and then stripping an adhesive tape repeatedly from the area in which the inflammatory lesion is being formed. The stripping is done approximately 40 times until a uniform redness appears. Test strips of the tapes above described are applied to the irritated areas. Also applied to similarly treated areas are a cream base containing 0.1 percent hydrocortisonealcohol (Cream Hi) and a cream base containing 0.1 triamcinolone acetonide (Cream Ti). The cream base is essentially of the aqueous vanishing cream type with polyoxyethylene sorbitan monostearate, alcohol, propylene glycol, glyceryl monostearate, spermaceti, cetyl alcohol, isopropyl palmitate, methylparaben and propylparaben. The redness of the stripped areas to which corticosteroid containing cream bases were applied was substantially reduced shortly after application, the same having a blanched appearance. After 3 hours, however, the anti-inflammatory effect was essentially nil with the areas having resumed their original redness. The areas under the adhesive tapes containing the corticosteroids, however, still had a blanched appearance. The effectiveness of the application is observed through a comparison of redness of the irritated skin at the applied areas. The tapes are removed after 6 hours and the areas inspected. The areas are again inspected ½ hour after removal, one hour after removal, ten hours after removal and twenty-four hours after removal. The appearance of the various areas is given in the following table:

TABLE

| Stripped area observed | Appearance | | | | |
|---|---|---|---|---|---|
| | At time of tape removal | ½ hr. after removal | 1 hr. after removal | 10 hrs. after removal | 24 hrs. after removal |
| No treatment | R | R | R | R | R |
| Cream Hi | R | R | R | R | R |
| Cream Ti | R | R | R | R | R |
| Tape A | R | R | R | R | R |
| Tape B | B | B | B | B | B |
| Tape C | Sl. B | Sl. B | R | R | R |
| Tape D | B | B | B | B | B |
| Tape E | B | B | B | B | B |
| Tape F | R | R | R | R | R |
| Tape G | B | B | B | R | R |
| Tape H | Sl. B | Sl. B | Sl. B | R | R |
| Tape I | B | B | B | Sl. B | R |
| Tape J | R | R | R | R | R |
| Tape K | B | Sl. B | Sl. B | R | R |
| Tape L | R | R | R | R | R |
| Tape M | Sl. B | Sl. B | Sl. B | R | R |
| Tape N | R | R | R | R | R |
| Tape O | Sl. B | Sl. B | R | R | R |
| Tape P | R | R | R | R | R |
| Tape Q | Sl. B | Sl. B | Sl. B | R | R |

NOTE.—Red: R. Blanch: B. Slight Blanching: Sl. B.

EXAMPLE II

In Example I the anti-inflammatory effectiveness of the corticosteroid containing adhesive coated sheets is illustrated particularly with respect to the residual effect after removing the adhesive coated sheet. The present example illustrates its long term effectiveness when remaining in contact with the wearer's skin.

An inflamed skin area is prepared in the manner described in Example I. A tape of the type described in Example I having an acrylate pressure-senstve coating containing no pigment and 1.0% by weight hydrocortisonealcohol is applied over a portion of the inflamed area. Over an adjacent portion of the inflamed area is applied an ointment containing 1.0% hydrocortisonealcohol and the area to which the ointment is applied is covered with Saran film. The areas are then observed periodically over a period of 30 hours beginning with the eighth hour after application. The anti-inflammatory effectiveness as shown by the degree of blanching or disappearance of redness is tabulated in the following table; B—indicated a complete blanch, PB—indicating a partial blanch, SB—indicating a very slight lessening of redness, i.e. only slight blanching and R—indicating no visible decrease in redness.

| Hours | Appearance after time indicated | | | | | |
|---|---|---|---|---|---|---|
| | 8 | 12 | 16 | 20 | 24 | 30 |
| Acrylate adhesive sheet with 1.0% hydrocortisone alcohol | B | B | B | B | B | B |
| Ointment with 1.0% hydrocortisone alcohol Saran film wrapping | B | B | PB | PB | SB | R |

The same test is repeated using some of the adhesive sheets of Example I. The adhesive coated sheets are given the same designation as used in Example I.

| Hours | Appearance after time indicated | | | | | |
|---|---|---|---|---|---|---|
| | 8 | 12 | 16 | 20 | 24 | 30 |
| Adhesive sheet: | | | | | | |
| Acrylate adhesive 0.1% triamcinolone acetonide—Tape E | B | B | B | B | B | B |
| Acrylate adhesive 0.1% hydrocortisone alcohol—Tape B | B | B | B | B | B | PB |
| Polyisobutylene base adhesive 0.1% hydrocortisone alcohol—Tape I | B | B | B | PB | PB | PB |
| Polyether adhesive 0.1% hydrocortisone alcohol—Tape O | B | B | B | PB | PB | SB |

EXAMPLE III

Two tapes are prepared having acrylate pressure-sensitive adhesives of the type described in Example I, the adhesives differing only in that one contains 1.0% by weight of hydrocortisonealcohol whereas the other contains no corticosteroid. These tapes are used to wrap an ankle area of the leg, the wrappings being applied side by side. After three days the wrappings are removed. Under the tape that contains no corticosteroid in the adhesive, a form of dermatitis results, most likely *Dermatitis venerata*, whereas no dermatitis is found to occur under the tape that contains the 1.0% by weight hydrocortisonealcohol.

Insofar as applicants are aware the period of effectiveness of corticosteroids in topical application is substantially enhanced through their incorporation in pressure-senstive adhesives. The adhesives used in the examples have been selected to illustrate the practice of the invention with the three classes of pressure-sensitive adhesives most generally used for skin application. Although particular adhesive compositions and tapes embodying the same have been used in illustrating the practice of the present invention, the invention is not to be limited thereto. In view of the foregoing disclosure, variations or modifications thereof will be apparent and it is intended to include within the invention all such modifications except as do not come within the scope of the appended claims.

Having thus described our invention, we claim:

1. A therapeutical device comprising a flexible backing having a pressure-sensitive adhesive coating on said backing, wherein said pressure-sensitive adhesive is selected from the group consisting of rubber based-, polyvinyl alkyl ether-, and acrylate-, pressure-sensitive adhesives and said pressure-sensitive adhesive coating containing an anti-inflammatory amount of corticosteroid.

2. A therapeutic device of claim 1 in which said pressure-sensitive adhesive is acrylic pressure-sensitive adhesive.

3. A therapeutic device of claim 1 in which said pressure-sensitive adhesive is rubber base pressure-sensitive adhesive.

4. A therapeutic device of claim 1 in which said pressure-sensitive adhesive is vinyl ether base pressure-sensitive adhesive.

5. A therapeutic device of claim 1 in which said backing and said pressure-sensitive adhesive coating are pervious to moisture vapor.

6. A therapeutic device of claim 5 in which said flexible backing and said pressure-sensitive adhesive coating are perforated.

7. A therapeutic device of claim 6 in which said pressure-sensitive adhesive coating is rubber base adhesive.

8. A therapeutic device of claim 5 in which said flexible backing is air pervious.

9. A therapeutic device of claim 8 in which said pressure-sensitive adhesive is a discontinuous coating of rubber base adhesive.

10. A therapeutic device of claim 8 in which said adhesive is acrylate adhesive.

11. A therapeutic device of claim 10 in which said adhesive is vinyl ether base adhesive.

12. A therapeutic device of claim 2 in which said corticosteroid is hydrocortisonealcohol.

13. A therapeutic device of claim 12 in which said hydrocortisone is present in an amount of at least 0.25% by weight of the pressure-sensitive adhesive.

14. A therapeutic device of claim 1 in which said corticosteroid is triamcinolone acetonide.

15. A therapeutic device of claim 14 in which said pressure-sensitive adhesive is acrylate base pressure-sensitive adhesive.

16. A moisture pervious therapeutic tape comprising an air pervious backing, a moisture pervious acrylate pressure-sensitive coating on said backing, said acrylate pressure-sensitive adhesive coating containing an anti-inflammatory amount of corticosteroid uniformly dispersed therethrough.

17. A therapeutic device comprising a transparent flexible backing, a transparent acrylate pressure-sensitive adhesive coating on said backing, said pressure-sensitive adhesive coating containing an anti-inflammatory amount of corticosteroid uniformly dispersed therethrough.

18. The method of preparing therapeutic pressure-sensitive adhesive coated sheets comprising forming a solution of pressure-sensitive adhesive and corticosteroid in organic solvent at a temperature below 200° F., spreading said solution on a flexible backing and then evaporating said solvent by drying at a temperature of less than 200° F. to leave a film of said pressure-sensitive adhesive with said corticosteroid dispersed therethrough on said backing.

19. The method of treating skin lesions comprising covering said lesions with a thin film of pressure-sensitive adhesive containing an anti-inflammatory amount of corticosteroid uniformly dispersed therethrough said adhesive film being in intimate contact with the underlying skin containing said lesions and being adhered thereto.

20. A transparent pressure sensitive adhesive tape comprising a flexible backing having a pressure sensitive copolymer of an acrylate ester adhesive coating on said backing, said pressure sensitive coating containing an anti-inflammatory amount of a corticosteroid uniformly distributed therein.

References Cited

UNITED STATES PATENTS

| | | | |
|---|---|---|---|
| 2,268,746 | 1/1942 | Froyd | 128—153 |
| 2,925,174 | 2/1960 | Stow | 206—59 |
| 2,927,914 | 3/1960 | Hosmer et al. | 260—91.1 |
| 3,073,743 | 1/1963 | Spero | 167—65 |
| 3,231,419 | 1/1966 | Korpman | 117—122 |
| 3,249,109 | 5/1966 | Maeth et al. | 128—268 |
| 3,287,222 | 11/1966 | Larde et al. | 167—84 |

FOREIGN PATENTS

| | | | |
|---|---|---|---|
| 950,380 | 2/1964 | Great Britain | 167—84 |
| 676,096 | 12/1963 | Canada | 117—122 PA |

OTHER REFERENCES

Drug and Cosmetic Industry, May 1964, page 773.

STANLEY J. FRIEDMAN, Primary Examiner

A. J. ROBINSON, Assistant Examiner

U.S. Cl. X.R.

117—122; 424—33, 34